April 29, 1952  W. L. TATHAM  2,594,697
PISTON PACKING RING ASSEMBLY
Filed June 16, 1948  6 Sheets-Sheet 1
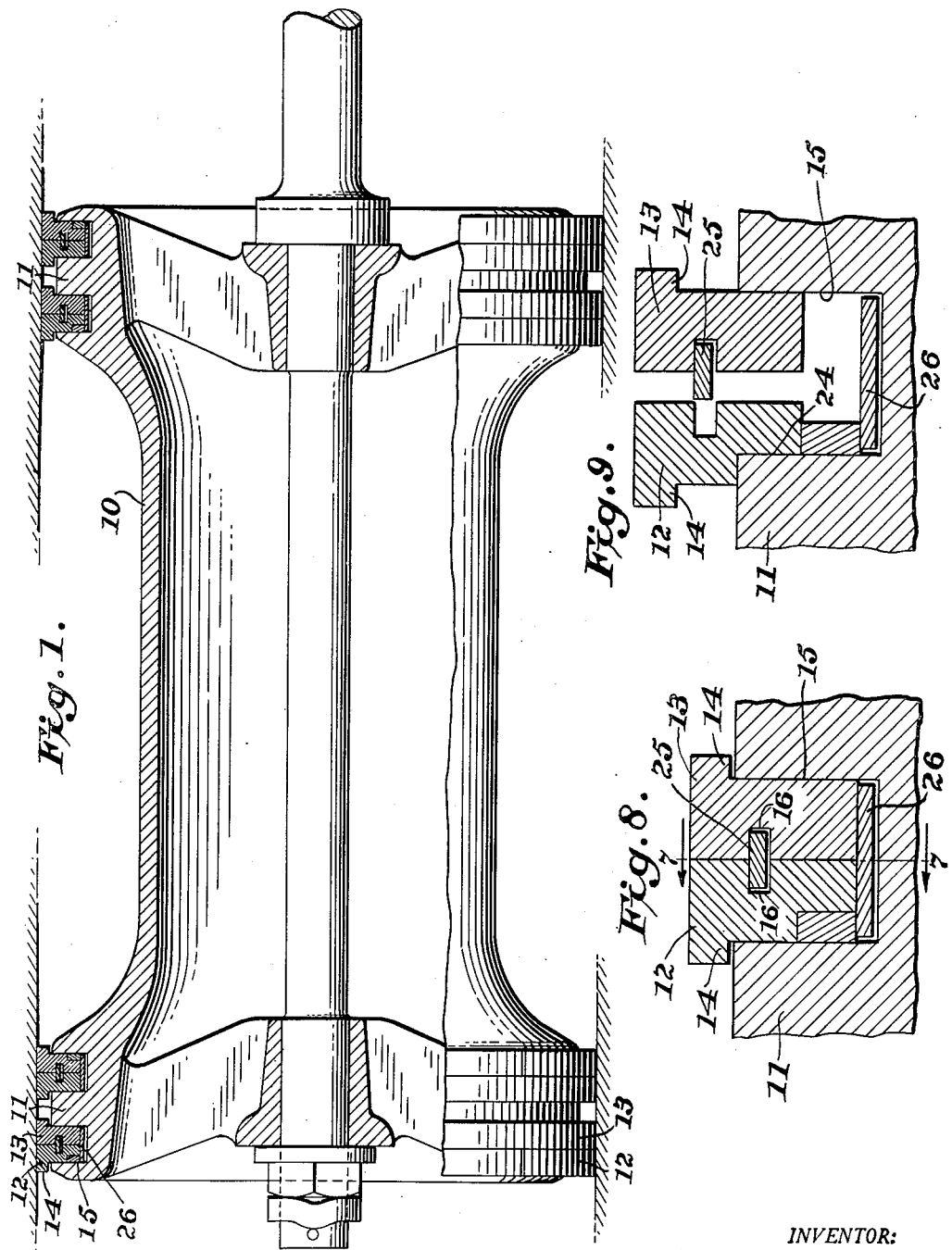
INVENTOR:
Willard L. Tatham,
BY
Cushman, Darby & Cushman
ATTORNEYS.

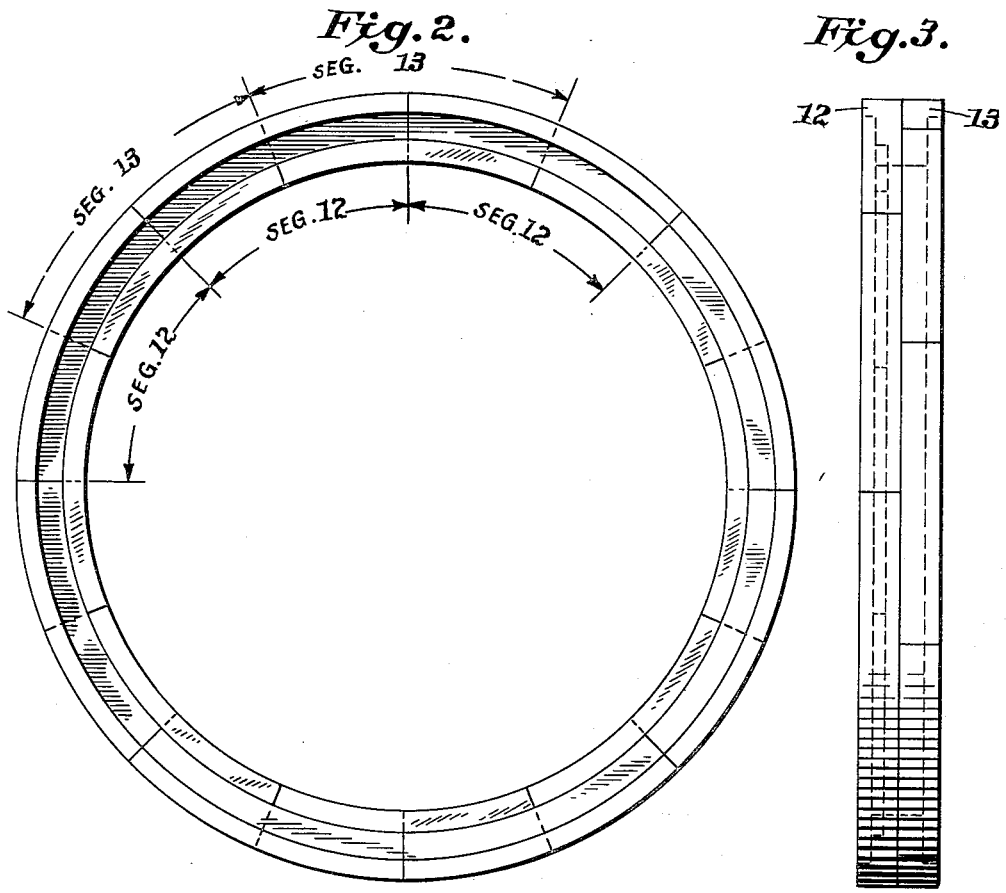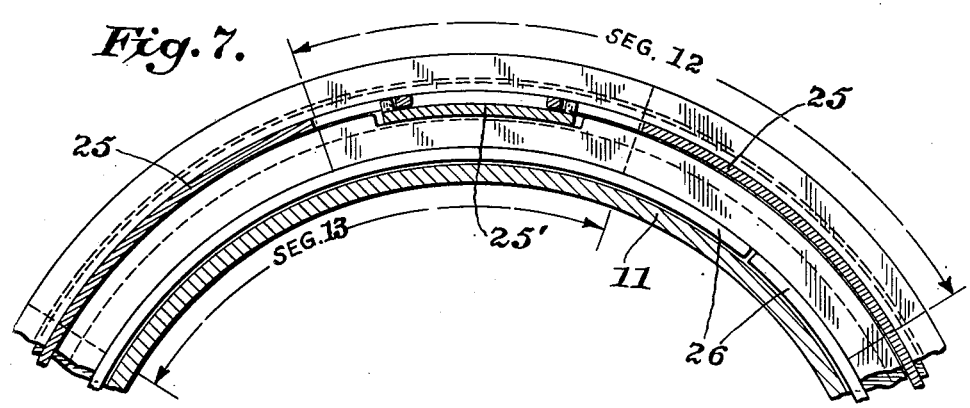

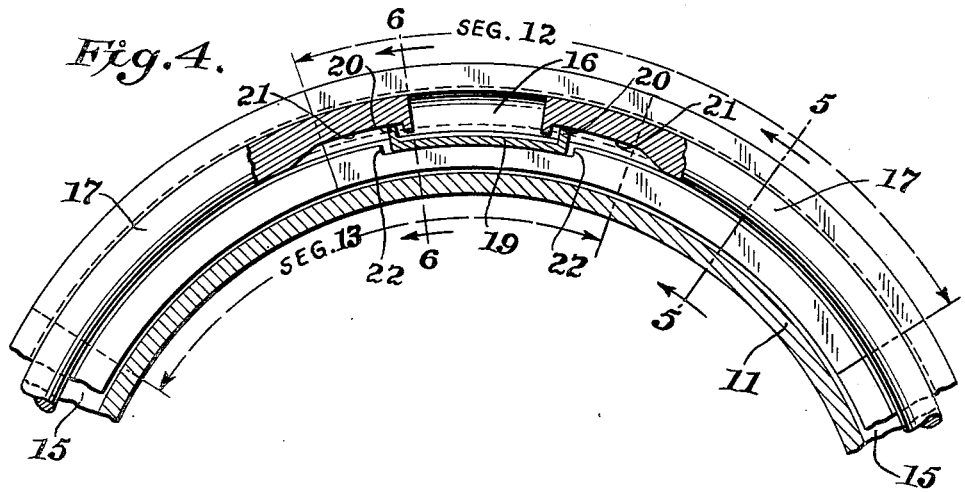
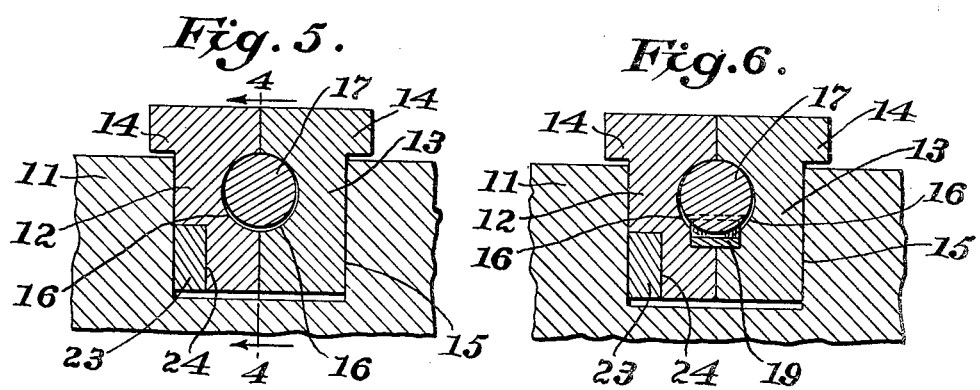
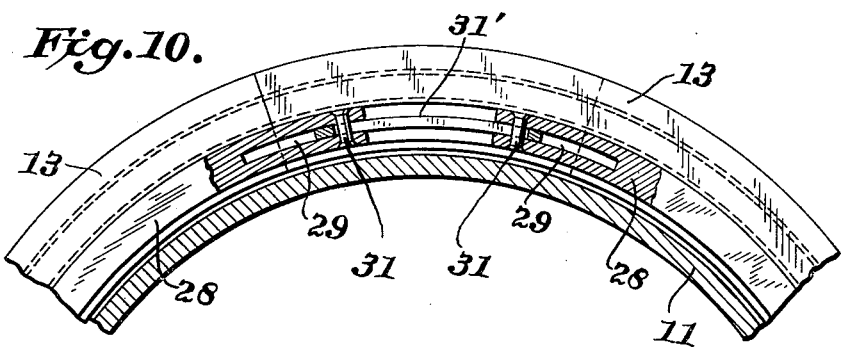

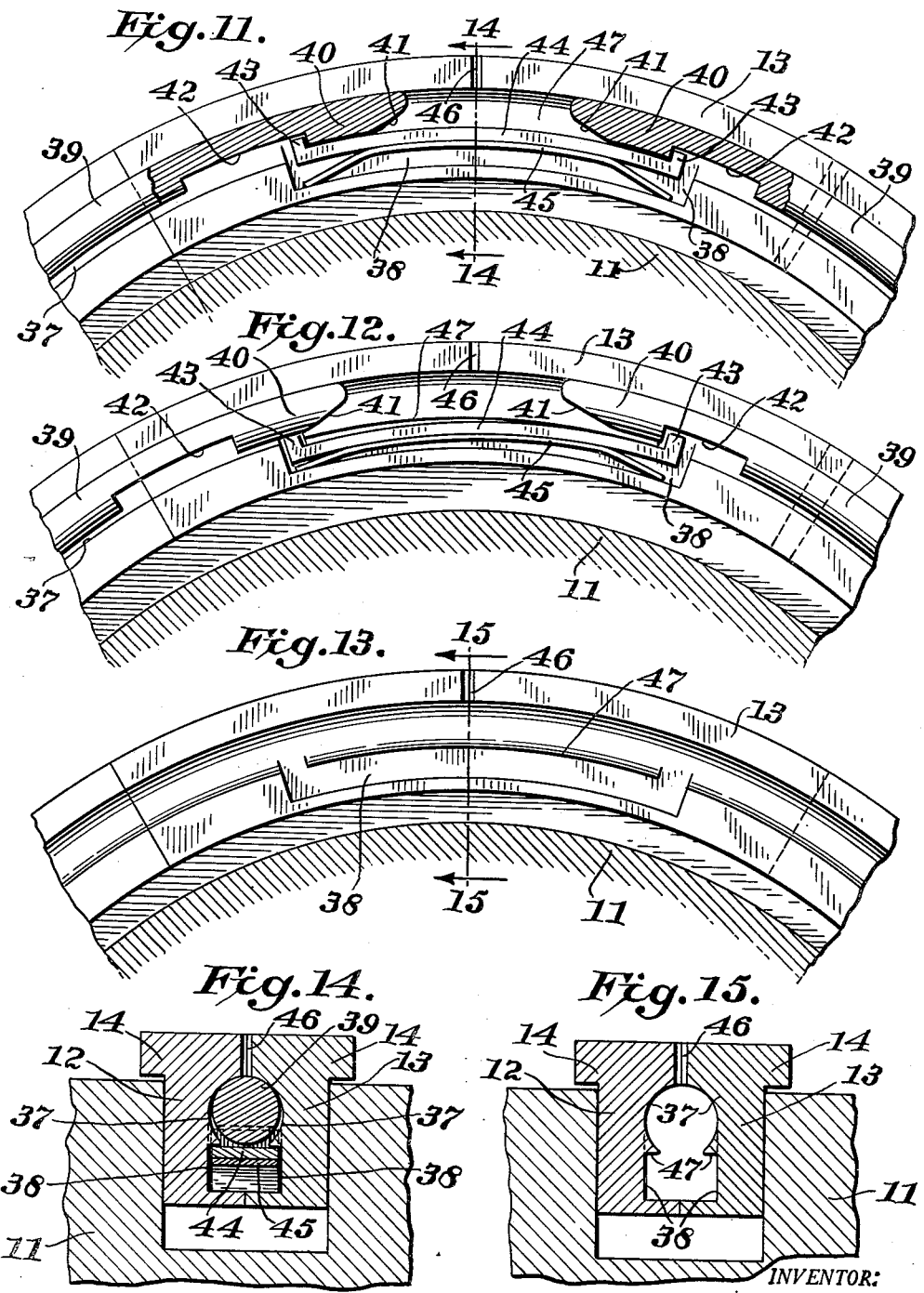

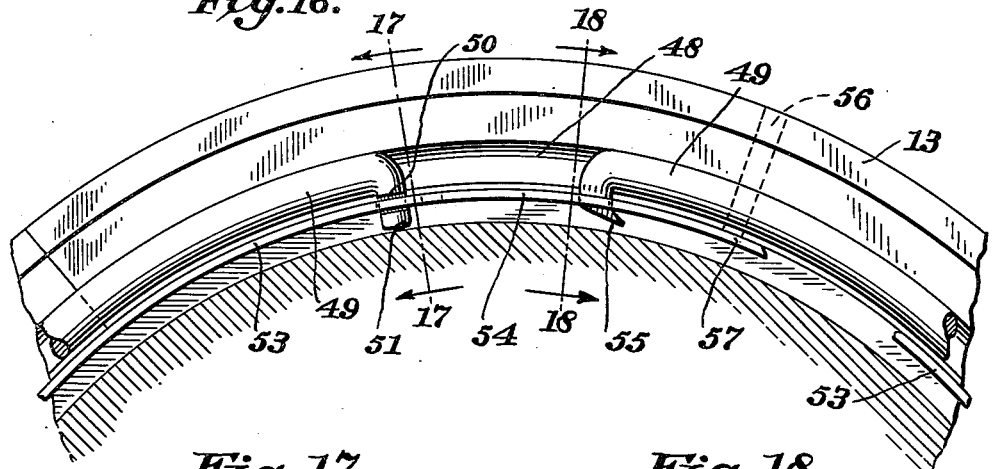
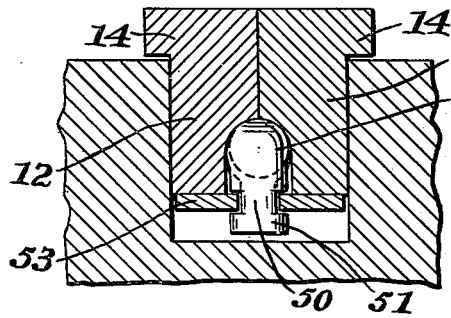
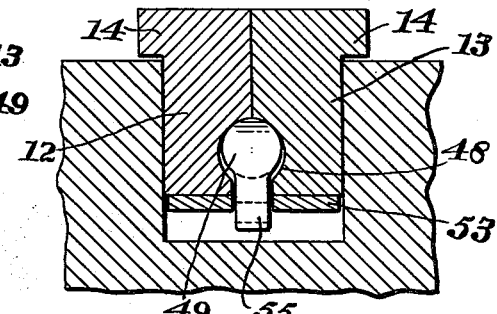
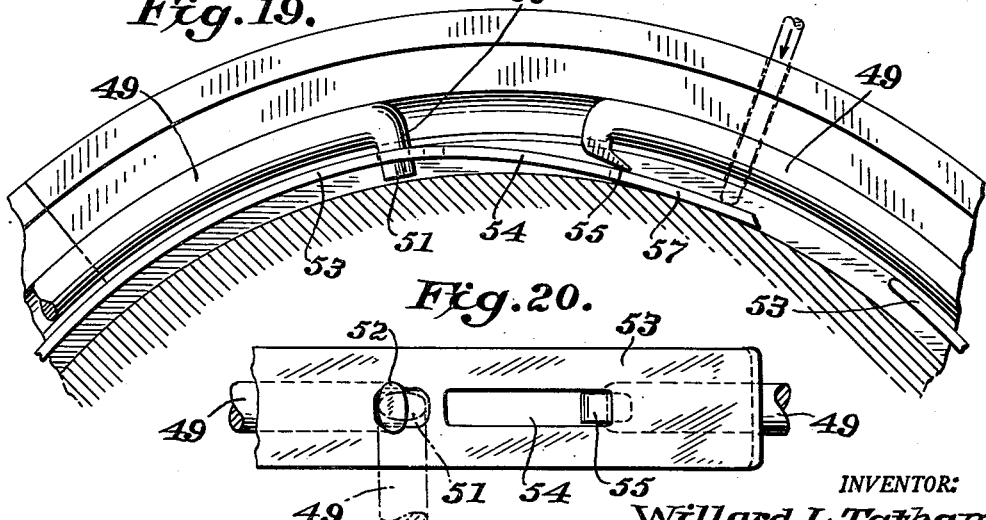
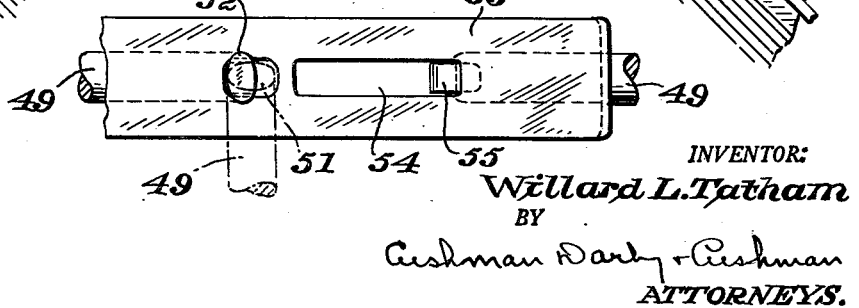

April 29, 1952     W. L. TATHAM     2,594,697
PISTON PACKING RING ASSEMBLY
Filed June 16, 1948     6 Sheets—Sheet 6
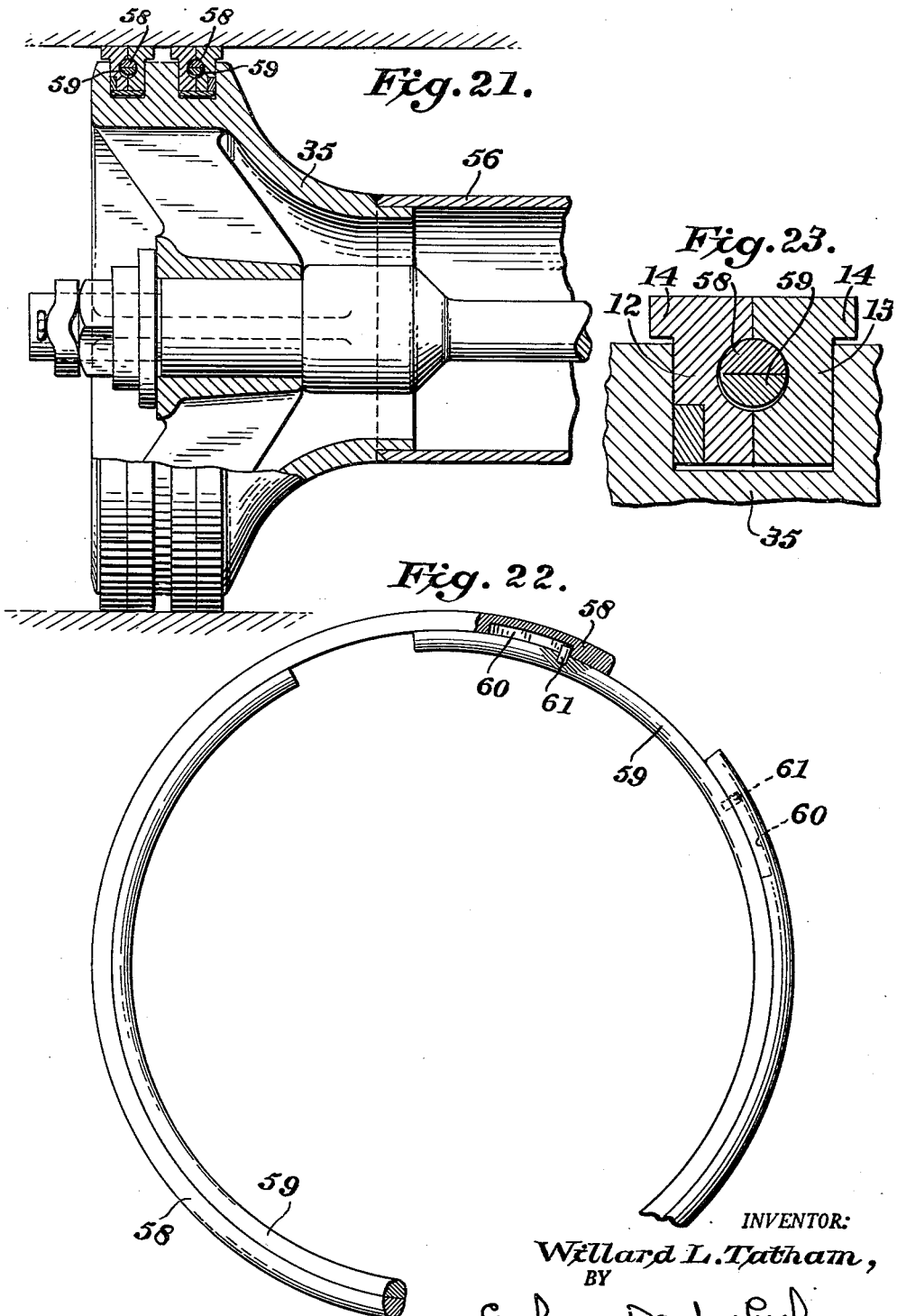
INVENTOR:
Willard L. Tatham,
BY
Cushman Darby Cushman
ATTORNEYS.

Patented Apr. 29, 1952

2,594,697

UNITED STATES PATENT OFFICE 2,594,697

PISTON PACKING RING ASSEMBLY

Willard L. Tatham, Decatur, Ill.

Application June 16, 1948, Serial No. 33,392

13 Claims. (Cl. 309—44)

This invention has to do with piston heads and piston ring assemblies of the multiple ring type. It is designed particularly for use with steam engines, but is adaptable to other engines of the compression and exhaust type such as, for example, diesels.

It has for its object to provide a piston head and a ring assembly in which the piston head and rings are of simple construction, and the assembly and removal of which rings on the head may be easily and expeditiously done. Further, the arrangement of the rings is such that the multiple rings of the assembly will be radially expansible, means being provided to limit such radial expansion within a range which, while insuring proper contact between the active ring surfaces and the walls of the piston cylinder, will prevent unrestricted expansion. The construction is one in which the ring seats or grooves in the piston head which receives the rings may be easily machined to provide circumferentially open grooves having bottom and side walls integral with the head, and shoulders or projections which permit the accumulation of scavenged products, which might interfere with proper functioning, are eliminated. The assembly is self-retaining in the piston groove and may be applied and removed from the groove with a minimum of effort. The construction permits the use of a lighter piston, admitting the use of lighter piston valves and reduces the drag on and work of the actuating instrumentalities.

Stated briefly, the construction embodies a piston head having circumferentially open ring seats or grooves developed in the periphery of the head, the bottom and side walls of the grooves being integral with the head. In the grooves of the head are mounted a plurality of segmental piston rings, two being here shown. These rings are circumferentially mountable and demountable in the grooves of the head and are disposed in overlapping relation relative to one another so that their contact surfaces are maintained always in symmetrical relation to one another and to the cylinder wall. Spring means for expansion of the segments is provided to expand the ring assembly radially, the radial movements of the segments under the action of the spring being restricted by means of a limiting clip which interlocks with the ends of the spring so as to hold spring expansion and radial ring movement within a certain range. Additionally, there may be provided an expanding ring member which tends to move the entire assembly radially.

In the drawings herewith, is shown an embodiment of the invention and in said drawings:

Figure 1 is a view of a piston illustrating the invention, four ring assemblies being shown on the piston heads.

Figure 2 is a view in side elevation of a ring assembly.

Figure 3 is an edge view of the ring assembly shown in Figure 2.

Figure 4 is an enlarged detail sectional view on line 4—4 of Figure 5 of a portion of a piston with a groove, the rings and expansion spring being shown in assembled position.

Figure 5 is a view in section on substantially line 5—5 of Fig. 4, showing the assembling of the rings and the expansion spring.

Figure 6 is a view in section on substantially the line 6—6 of Fig. 4, showing the assembled rings and an expansion spring for moving the assembly radially.

Figure 7 is a view in section of a ring assembly showing a different form of piston ring assembly and limiting clip.

Figure 8 is a view in section of the ring assembly shown in Fig. 7.

Figure 9 is a view showing the ring assembly in separated relation for assembling or removing segments.

Figure 10 is a sectional view showing a different assembly and limit clip.

Figure 11 is a sectional view of a modified form of assembly and clip.

Figure 12 is a sectional view showing the limit clip in unlocked position.

Figure 13 is a view with the spring and clip removed.

Figure 14 is a view in section substantially on the line 14—14 of Fig. 11.

Figure 15 is a cross-sectional view substantially on the line 15—15 of Figure 13.

Figure 16 is a sectional view showing another form of assembly and clip.

Figure 17 is a sectional view on substantially the line 17—17 of Figure 16.

Figure 18 is a sectional view on substantially the line 18—18 of Figure 16.

Figure 19 is a view showing the limiting clip in disengaged position.

Figure 20 is a view in plan of a portion of the segment expansion spring and the limiting clip.

Figure 21 is a view of a portion of a piston showing a different form of piston construction and a modified form of the segment expansion spring.

Figure 22 is a view in elevation, partly in section, of the spring shown in Fig. 21.

Figure 23 is an enlarged cross sectional view of the assembly and spring shown in Fig. 21.

Referring to the drawings by numbers, and considering Figs. 1, 2, 3, 4, and 5, the same numbers designating the same parts in the several views, a single piece piston 10 is shown in Fig. 1, connected to a valve stem by cross pieces and mountable in a suitable cylinder. Said piston has circumferentially open ring-carrying grooved members 11, here shown as integral with piston 10 and disposed at the ends of the piston. The number of ring-carrying members may be varied and their positions on the piston 10 may be changed. The ring assembly is made up of a plurality of ring segments 12 and 13 which, as shown in Figures 2, 3, 4, 5, and 6, forms a circumferential assembly with the segments lapped on one another. The segments will be provided with extended portions 14 to give adequate contact areas to engage the cylinder wall.

Segments 12 and 13 are mounted in plain walled recesses 15 into which they may be inserted by successively passing them circumferentially into the recesses 15 until the assembly is complete except for the last two segments. These will be placed in position by moving them laterally from the position shown in Figure 5 to the final assembled position shown in Figure 4, thus completing the assembly.

As shown in Figures 1, 4, 5, and 6, the inner faces of segments 12 and 13 are plain contact faces except for the recesses 16 to receive segment expanding spring 17, and the outer faces of the segments have plain contact surfaces to engage the surfaces of the plain-walled recesses 15. These plain contact surfaces, since they do not present any ledges or projections, prevent the lodgment of any material which might clog or interfere with piston action.

The recesses 16 in the meeting faces of segments 12 and 13 extend circumferentially of the units of the assembly and receive the segment expanding spring 17, as shown in Figs. 4, 5, and 6. Spring 17, here shown as round in cross section, tends to expand the units of the assembly to maintain proper contact with the cylinder wall. The action of spring 17 is, however, limited to a maximum expansion by means of a limiting clip or latch 19, shown in Figs. 4, 5, and 6, which clip has projecting ends 20 engaging recesses 21 in spring 17. Clip 19 is seated in recesses in segments 12 and 13 and is adapted to contact limiting abutments 22 at the ends of the recesses 21 in the spring 17. With this limiting clip 19 disposed in this manner, the spring 17 will be held against undue or over-expansion, while leaving it free to expand and contract to meet the normal needs of the ring assembly. Spring 17 acts on the units of the segment assembly and tends to urge them radially to an extent limited by the expansion limiting clip 19, the complete assembly being held in the groove at all times. The entire assembly may be further actuated by spring 23, shown in Figures 4 and 5, which engages a recess 24 in segment 12 when the parts are assembled and tends to move the entire ring assembly outwardly. Action of spring 23 is obviously limited by ring assembly contact with the cylinder wall, and the clip 19 will have a restraining effect on over-expansion of spring 23. Recess 24 in segment 12 is also used to assemble the last two segments and to remove the first two segments from the groove as shown in Fig. 9.

In Figs. 7, 8, and 9, the parts are as hereinbefore described, except that spring 25 takes the form of a flat spring instead of the round form of Figures 4, 5, and 6, and a spring 26 is disposed beneath the entire assembly and tends to urge it radially. Spring 26 adds to or performs the function of spring 23, shown in Figures 4 and 5. When spring 26 is used spring 23 may be dispensed with, if desired. Spring 23 will then be cut into segments.

In the form of the invention shown in Figures 7, 8, and 9, the members 12 and 13 are the same as heretofore described and mounted in the recess 15 of the head 11. Mounted in the recess between the meeting faces of the segments 12 and 13 is a flat spring 25 slotted at its ends as shown in Figure 7 and these slotted ends are engaged by a limiting clip 25' having up-turned ends to engage the slots in the spring 25 so as to limit its expansion and an expanding spring 26 being placed beneath the entire assembly.

In Figs. 11, 12, 13, 14, and 15, a different arrangement of expanding spring and limiting clip is shown. The segments 12 and 13 are of the same general construction as heretofore described but will be hollowed out at 37 and 38 to form seats for the limiting clip and the expanding spring. The expanding spring 39 is preferably round in cross section and provided with chamfered or inclined end surfaces 41 so as to insure their ready engagement with the limiting clip. They are also provided adjacent their ends with clip-engaging recesses 42 adapted to engage the up-turned ends 43 of the limiting clip 44 when the parts are assembled as shown in Figure 11. Below the limiting clip 44 is a spring 45 which tends normally to hold the limiting clip 44 with its ends 43 in engagement with the recesses 42 in the spring 39 so as to hold the parts in assembled position. In order to disengage the limiting clip 44 from the recesses 42 and permit disassembling of the parts, the segments 12 and 13 have on their inner contact faces at their upper ends vertically disposed half-round apertures 46 to form a tool opening through which a suitable tool may be thrust and engage the limiting clip 44, forcing it downward to the position shown in Figure 12 against the spring 45, thus releasing the ends 40 of the spring 39 and permitting one or both of the ends 40 of the spring 39 to be released. It will be observed that the limiting clip 44 will be retained in its recess 38 between the segments 12 and 13 by means of projections 47 extending inwardly between the recesses 37 and 38. This provides a very compact construction and it will be seen that the segment expanding spring 39 performs the necessary expanding functions without the necessity of additional spring means for moving the assembly radially, the spring 39 expanding the segments 12 and 13 uniformly, while the limiting clip 44 prevents undue expansion.

In the form of the invention shown in Figure 10, a slightly different arrangement is provided. In this modified form a different limiting clip is shown. The ends of the expanding spring 28 are slotted at 29 and cross screws or rivets 31 are provided. The clip 31' is slotted lengthwise and engaged with the cross screws or rivets 31. This permits the necessary compression and expansion of spring 28 but holds it to a limit of expansion as heretofore described in connection with the other forms.

In the form of the invention shown in Figs. 16 to 19 inclusive, the segments 12 and 13 are similar in make-up to those heretofore described, being provided on their inner faces with half-round recesses 48 which form between them a recess to receive a round segment expanding spring 49. Spring 49 will be provided at one end with an inwardly turned head 50 which, as here shown, has an enlarged end 51 to engage an opening 52 in a spring 53, which spring 53 serves also as a limiting clip. Spring 53 is provided with a slot 54 engaged by a hook 55 formed at the other end of the spring 49. In interlocked position, as shown in Figure 16, with the head 50 engaging the opening 52 in the spring 53 and the hook 55 at the other end of the spring 49 engaging the slot 54 in the spring, the action of the segment expanding spring 49 is limited, although holding the segments 12 and 13 in yielding relation to the cylinder wall. In order to disengage the limiting clip formed by the spring 53 from the hook 55 on the end of the spring 49, a tool may be inserted through the space 56 between the ends of adjacent segments to engage the end 57 of the limiting spring 53 and force it downwardly, as shown in Figure 19, out of engagement with the hook 55, thus releasing the assembly for removal.

As shown in Figs. 21, 22, and 23, the piston is of a slightly different form than that shown in Figure 1. Instead of being formed in one piece as disclosed in Figure 1, piston heads 35 will be provided having the grooves formed therein to receive the piston rings, and these heads will be joined by a relatively light tube 56 welded or otherwise suitably secured so as to join the heads and form a piston. This construction gives a lighter but easily assembled piston construction.

Figures 21, 22, and 23, show a make-up of expansion ring of somewhat different form, although functionally it performs as the rings hereinbefore described, in that it tends to expand the assembly radially, but is limited to a certain maximum of expansion. In this form a multi-part spring is made up of two parts 58 and 59, preferably half-round, although other cross-sections may be used. Each section 58 and 59 has spaced apart ends to permit expansion and contraction, and the sections are nested relative to each other in recesses in segments 12 and 13, as shown, with the spaced ends opposed. One of the sections, here shown as the outer section 58 has channels 60 formed in its inner face. The other section 59, here shown as the inner section, has pins 61 extending outwardly to engage the channels 60 so as to permit relative expansion and contraction of sections 58 and 59 and permit them to act on the ring assembly in the manner heretofore described in connection with the other expansion rings. It will be seen that the channel and pin construction of Figs. 21, 22, and 23, while permitting normal functioning of the two-part ring, limits its expansion as do the limiting clips of the other ring forms.

Assemblies made in accordance with the disclosures herein can be conveniently manufactured. They can be readily put together in working relation to the piston in a plain piston groove without any special groove construction to permit installation or removal. They are self-retaining when once positioned, and are limited to a maximum expansion under the influence of the expanding rings, so as to provide a compact, efficiently functioning assembly.

Changes from the particular illustrative disclosures here made which involve only mechanical skill, and which are comprehended by the definitive claims appended hereto, are to be regarded as within the range of the invention.

I claim:
1. A piston ring assembly comprising a plurality of overlapping circumferentially arranged segments mountable for radial movement in piston recesses, a spring engaging the segments of the assembly to expand them radially, and an insertable clip engaging the spaced ends of said spring to limit outward spring expansion.

2. The invention as defined in claim 1 in which the spring expansion limiting device comprises a clip engaging projections on the spaced ends of the spring.

3. The invention as defined in claim 1 in which the spring expansion limiting means comprising a slotted clip engaging projections on the spaced ends of the spring.

4. The invention as defined in claim 1 in which the expansion limiting means comprises a spring actuated clip engaging projections on the spaced ends of the spring.

5. A piston ring assembly comprising a plurality of overlapping circumferentially arranged segments having uninterrupted side walls mountable for radial movement in piston recesses and matching recesses in their inner contact faces, a spring having spaced ends mounted in the recesses of said segments and extending throughout the circumference of the assembly, and a clip engaging the spaced ends of said spring to limit outward spring expansion.

6. A piston ring assembly comprising a plurality of overlapping circumferentially arranged segments having uninterrupted side walls mountable for radial movement in piston recesses and matching recesses in their inner contact faces, a spring having spaced ends mounted in the recesses of said segments and extending throughout the circumference of the assembly, a clip engaging the spaced ends of said spring to limit outward spring expansion, and a clip-actuating spring below said clip to insure contact of said clip with the spaced ends of said spring.

7. The invention as defined in claim 6 in which the segments below the clip are recessed to provide clearance to the spring engaging clip.

8. The invention as defined in claim 6 in which a second expanding spring is disposed in the bottom of the piston recess below the ring assembly.

9. A piston ring assembly comprising a plurality of overlapping circumferentially arranged segments mountable for radial movement in piston recesses and having tool receiving spaces between them, a spring engaging said segments to expand them radially, and a spring limit clip to limit expansion of said segment expanding ring, said clip being releasable by a clip engaging tool insertable between said segments.

10. A piston ring assembly comprising a plurality of overlapping circumferentially arranged segments mountable for radial movement in piston recesses, a spring having spaced ends engaging said segments to expand them radially, and a spring limit clip mounted in recesses in said segments to engage the spaced ends of said segment expanding spring.

11. A piston ring assembly comprising a plurality of overlapping circumferentially arranged segments mountable for radial movement in piston recesses, a multi-part spring engaging said segments to expand them radially, and expansion limiting means coupling the ends of said multi-part spring to limit radial expansion of said segments.

12. A piston ring assembly comprising a plurality of overlapping circumferentially arranged segments mountable for radial movement in piston recesses, a multi-part spring engaging said segments to expand them radially, and expansion limiting means integral with said multi-part spring to couple their ends and limit radial expansion of said segments.

13. A piston ring assembly comprising a plurality of overlapping circumferentially arranged segments mountable for radial movement in piston recesses, a spring engaging the segments of the assembly to expand them radially and to hold said segments in assembled position against the outer circumference of the piston, a clip engaging the spaced ends of said spring to limit outward spring expansion, a slotted portion in one of said segments to receive said clip, a second spring circumferentially mounted at the side of the assembled segments, and a third spring circumferentially mounted beneath said segments, said second and third springs cooperating with said first spring to hold the segments in assembled position and urge the entire assembly against the cylinder wall.

WILLARD L. TATHAM.

REFERENCES CITED

The following references are of record in the file of this patent:

UNITED STATES PATENTS

| Number | Name | Date |
|---|---|---|
| 1,718,758 | Muchnic | June 25, 1929 |
| 1,970,132 | Ellet | Aug. 14, 1934 |
| 2,006,902 | Morton | July 2, 1935 |
| 2,235,809 | Gilmer | Mar. 18, 1941 |
| 2,237,010 | Muchnic | Apr. 1, 1941 |
| 2,425,649 | Smith | Aug. 12, 1947 |

FOREIGN PATENTS

| Number | Country | Date |
|---|---|---|
| 404,102 | Great Britain | Jan. 11, 1934 |